Dec. 14, 1965    B. EDWARDS    3,223,305
PLASTIC CUP WITH FINS
Filed Dec. 14, 1962    2 Sheets-Sheet 1
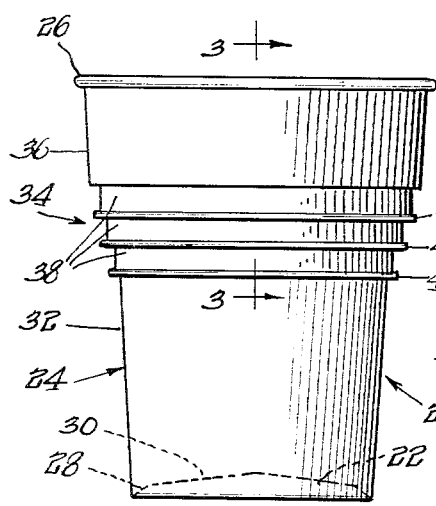
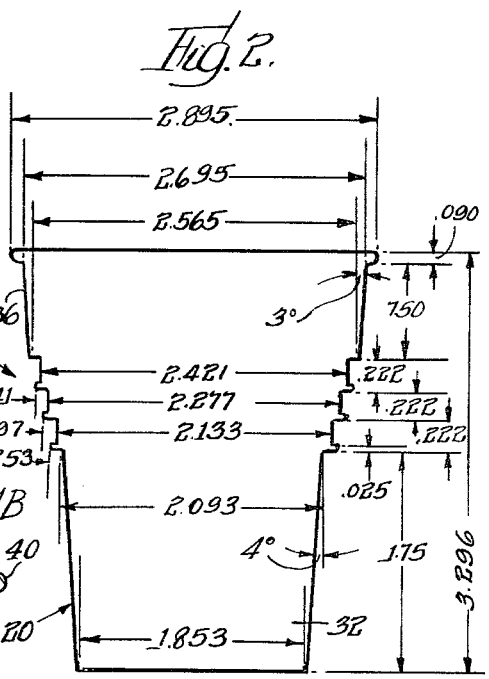
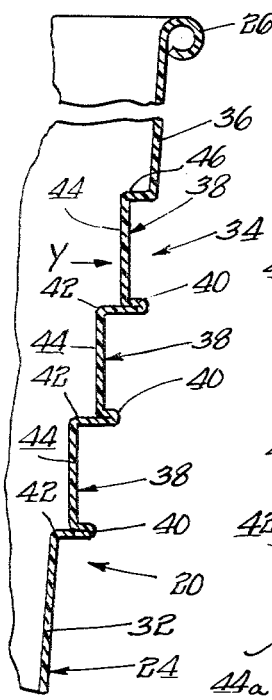
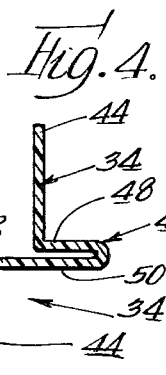
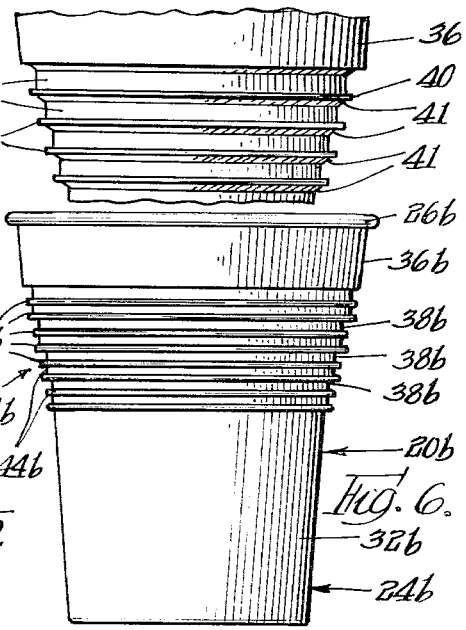
INVENTOR.
Bryant Edwards
BY Olson, Trexler
Wolter & Bushnell
attys.

Dec. 14, 1965 B. EDWARDS 3,223,305
PLASTIC CUP WITH FINS
Filed Dec. 14, 1962 2 Sheets-Sheet 2
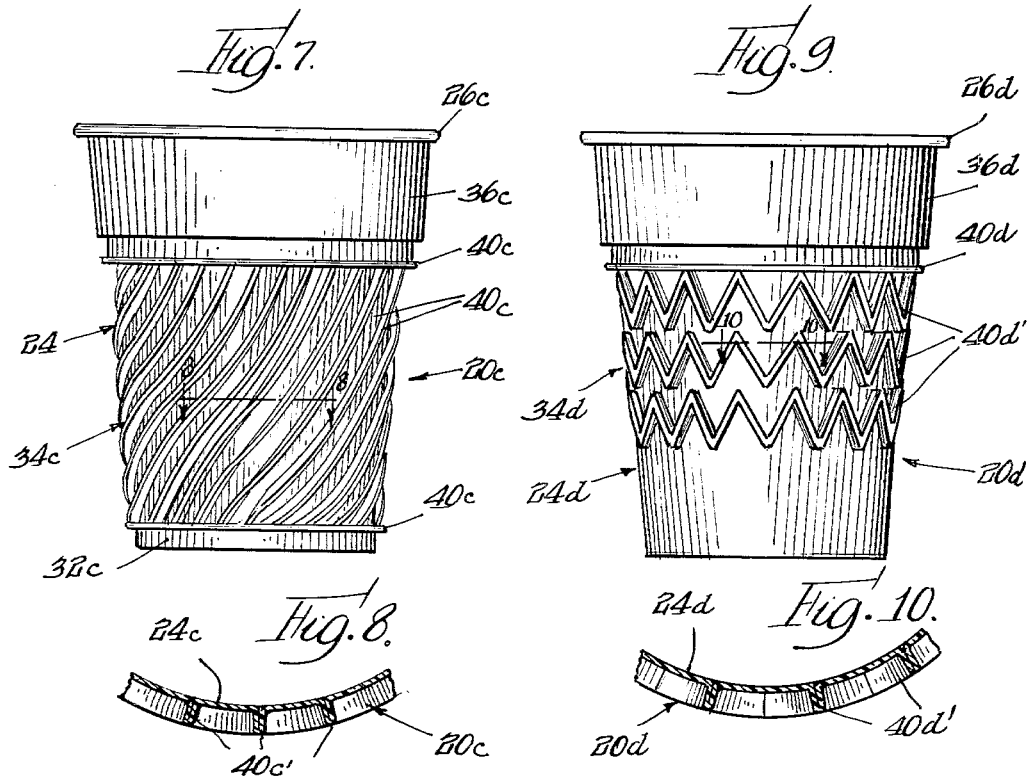
INVENTOR.
Bryant Edwards
BY Olson, Trexler
Wolters & Bushnell attys.

United States Patent Office 3,223,305
Patented Dec. 14, 1965

3,223,305
PLASTIC CUP WITH FINS
Bryant Edwards, Clarendon Hills, Ill., assignor to Illinois Tool Works Inc., Chicago, Ill., a corporation of Delaware
Filed Dec. 14, 1962, Ser. No. 244,615
10 Claims. (Cl. 229—1.5)

This invention is concerned with a molded plastic cup or the like container of the throw-away variety, and more particularly with such a cup adapted for use with hot beverages.

Expendable or throw-away cups are well known and are widely available on the market. For a great many years, all such cups were made of paper, generally coated or impregnated with wax or plastic.

Paper cups have many inherent drawbacks, most of which have been overcome in recent years by the introduction of thin-wall plastic cups. Such cups, usually made by various molding processes from sheet plastic stock are competitive in price with paper cups. They possess many advantages thereover, including a more favorable "touch" to the lips of the user, the absence of moisture absorption and vapor transmission, and the absence of any seams requiring glue or adhesive which often provides a weakness in structure and which are generally unsightly. Plastic cups are molded by high temperature techniques that automatically sterilize the plastic material. The plastic is not subject to contamination by bacteria or fungus, and plastic cups can be molded in any desired colors without any material increase in cost, thereby avoiding the necessity of printing, such as is done in connection with paper cups to improve the appearance thereof.

Any thin-wall material inherently possesses poor insulating qualities. Consequently, hot coffee, soup, or other hot liquids served in thin-wall cups, whether of plastic or paper, can be quite uncomfortable to hold. Paper cups have often had handles affixed thereto. This materially increases the cost. Furthermore, such handles frequently tear or come loose, allowing the contents of the cup to be spilled.

In my previous Patent 2,905,350, "Cup for Hot Beverages," I have disclosed a plastic cup having circumferential steps or ridges therein providing a more or less line contact with the fingers of the user. The line contact materially reduces heat transfer over a comparable cup without the steps or ridges. Furthermore, the steps or ridges materially reinforce or rigidify the sidewall of the cup, which otherwise would be readily indented by finger pressure.

Although the cup disclosed and claimed in my aforesaid Patent 2,905,350 presents a marked improvement over prior cups, the fingers of the user tend to form a little more than line contact with the cup. Furthermore the adjacent portions of the cup are in rather close proximity to the user's fingers adjacent the actual lines or areas of contact, whereby a certain amount of heat is transferred to the fingers by radiation.

Accordingly, it is an object of the present invention to provide an improved plastic cup minimizing heat transfer from the contents of the cup to the fingers of a user.

More specifically, it is an object of this invention to provide a plastic cup or the like for use with hot beverages, which cup has a plurality of outwardly protruding fins for substantially line engagement with the fingers of the user.

It is yet another object of this invention to provide a plastic cup or the like for use with hot beverages etc., which cup is provided with integral, double wall reentrant fins or flanges affording a substantially line contact with the fingers of the user.

It is an object of this invention to provide a plastic container having outwardly protruding integral fins spacing the walls of the container from adjacent surfaces.

A further object of this invention is to provide a plastic cup or the like container having outwardly protruding fins thereon aiding in stacking cups in telescopic relation, as for use in a vending machine.

Other and further objects and advantages of the present invention will be apparent from the following description when taken in connection with the accompanying drawings wherein:

FIG. 1 is a side view of a cup constructed in accordance with the present invention;

FIG. 1A is a fragmentary view similiar to a portion of FIG. 1 showing a modification of the fin structure thereof;

FIG. 1B is a view similar to FIG. 4 but showing the fin configuration of FIG. 1A;

FIG. 2 is a view generally similar to FIG. 1 and indicating various dimensions thereon;

FIG. 3 is an enlarged longitudinal sectional view through the cup as taken substantially along the line 3—3 in FIG. 1;

FIG. 4 is a further enlarged detail view of one of the fins as taken in axial section;

FIG. 5 is a view similar to FIG. 4 and showing a slight modification;

FIG. 6 is a side or elevational view of a modified form of the cup;

FIG. 7 is a side view showing a further modification with the fins arranged spirally;

FIG. 8 is a horizontal sectional view taken substantially along the line 8—8 in FIG. 7;

FIG. 9 is a side view of a further modification of the invention wherein the fins are in a generally zig-zag arrangement;

FIG. 10 is a horizontal sectional view through the cup of FIG. 9 substantially along the line 10—10.

Referring now in greater particularity to the drawings, and first to FIG. 1, there will be seen a plastic cup constructed in accordance with the principles of this invention and generally designated by the numeral 20. The cup includes a bottom 22, a sidewall 24 integral therewith, and a rolled-over rim 26 at the top of the sidewall, defining an open upper end. The bottom 22 preferably comprises a circumferential ring or edge portion 28 of frusto-conical configuration, and a central conical portion 30 of relatively more shallow taper. This bottom portion is simple to fabricate, and provides strength and reinforcing to the bottom portion of the sidewall 24, as well as providing a very strong bottom which does not tend to sag under the weight of liquid in the cup.

The sidewall 24 comprises a frusto-conical lower portion 32 tapering up and slightly out at a shallow angle, an intermediate finger gripping ring portion 34 of slightly greater taper, and an upward portion 36 of substantially the same taper as or very slightly less taper than the lower portion 32.

The intermediate finger gripping ring section 34 as may be seen in FIG. 1, and in greater detail in FIG. 3, comprises a series of steps 38, illustrated as three in number. Each step is provided at its lowermost limit with a radially extending, circumferential fin or flange 40 of double thickness. The fins 40 are in the nature of horizontal rings, and each step comprises a horizontal offset or tread portion 42 forming a continuaiton of the lower thickness of the fin 40, and a vertical riser or cylindrical portion 44 extending up from the inner limit of the upper thickness of the fin 40. A horizontal shoulder or offset 46 joins the top of the upper cylindrical section 44 to the upper wall portion 36.

As will be apparent, each fin and accompanying step provide circumferential reinforcement to the sidewall, preventing collapse or indentation thereof under finger pressure attendant upon lifting of the cup. Additionally, each fin provides a vertically narrow area of contact, practically a line contact with the fingers of a user. In this connection, it will be understood that the fins are spaced closely enough that the thumb of an adult will normally span all three fins, while the index finger will readily engage all three of the fins, particularly if inclined at a slight angle in the normal cup-holding manner. In any event, even a child's thumb and finger will span at least two fins, and usually three. As a result, hot liquid which may be in the cup is spaced from the fingers of a user by the radial dimensions of the fins, as well as by the thickness of the material. This, coupled with the essentially line contact with the fingers materially inhibited that heat transfer to the fingers, whereby a cup may be held comfortably even when filled with extremely hot liquid, such as coffee, hot chocolate, soup or the like. Additionally, the fins markedly improve the rigidity of the sidewall.

In the embodiment of FIG. 1A, the cup is identical with that disclosed in FIG. 1, except that the cup wall is chamfered or bevelled at 41 immediately beneath each fin, thereby insuring maximum strength and uniformity of wall thickness. It also affords a camming action with a fin of the next higher cup in a stack, thereby imparting axial resiliency to the stack.

In order to provide a clear picture of the size of the cup, whereby it is readily grasped and lifted with one hand, typical dimensions in inches are applied to the cup as shown in FIG. 2. The thickness of the sidewall of the cup is preferably substantially uniform, and is on the order of .010" or slightly greater. Accordingly, the height of each fin 40 is typically on the order of 0.25", as indicated in FIG. 2, although this is subject to some variation due to manufacturing tolerances. It will be observed that the outside diameter of the bottom fin is indicated as being 2.253", while the inside diameter of the cylindrical portion or riser 44 of the next step above is 2.277", whereby cups may be telescoped with the lowermost fin fitting within the next above step and resting on the horizontal offset 42 at the top of the step with which the particular fin is associated. Similarly, the second fin from the bottom is indicated as having a diameter of 2.397", while the inside diameter of the next above step is 2.421". Hence, the second fin readily fits within the third step, and rests on the shelf at the bottom thereof.

Similarly, the top fin is indicated as having an outside diameter of 2.541", while the bottom of the upper wall portion 36 is shown as having an inside diameter of 2.565". Thus, the uppermost fin will fit within the upper wall portion without jamming thereagainst.

It will be realized that the stepped nature of the fins provides a guiding action against the inside of the upper wall portion 36, thereby facilitating proper telescoping of cups with one another. It further will be appreciated that each fin acts somewhat in the nature of a cantilevered support, since the area of engagement of any one fin with a subjacent cup is outwards of the line of attachment of the fin to the cup. Another way of looking at this is that each fin serves as a flexural spring ring. It will also be observed that the outer extremities of the fins may engage the sidewalls with a camming action, thus further producing axial resiliency in a stack. This imparts a controlled resiliency to a stack of cups, whereby to avoid splitting of a pasteboard or the like container in which a stack of cups may be shipped, should the stack of cups be dropped.

As shown in FIG. 4, the upper thickness 48 and the lower thickness 50 of each fin 40 may be disposed parallel to one another and slightly spaced apart. The actual spacing has been exaggerated somewhat for purposes of illustration in FIG. 4, and it may in some instances be completely absent. Alternatively, and as illustrated in FIG. 5 (similar parts are identified in FIG. 5 by like numerals with addition of the suffix a), upper thickness 48a and lower thickness 50a may be spaced apart in the main, but may have the inner portions contacting one another at 52, and preferably fused together. As will be understood, the forming of the cup is done with the plastic material heated to a plastic temperature, and at such temperature, it is a simple matter to bring two parts into contact so that they will fuse or stick together.

It will be appreciated that in any case where the cup is to be re-used, it is preferred to have the upper and lower portions of each fin brought together and fused at 52, to avoid any crevices in which foodstuffs or the like might accumulate and be attacked by bacteria or the like.

A modified form of the invention is shown in FIG. 6, and in this embodiment, there are two fins 40b for each step. One fin is at the bottom of each step, as in the previous embodiment, while the second fin is in the middle of the vertical riser or cylindrical portion 44b. The remaining features of the cup in FIG. 6 are similar to those heretofore shown and described, and like parts are identified by similar numerals with the addition of the suffix b, thereby obviating the necessity of extended and repetitive description.

A further embodiment of the invention is shown in FIGS. 7 and 8. In this embodiment of the invention, many of the parts are similar to those heretofore shown and described, and similar numerals are utilized with the addition of the suffix c to identify similar parts. The cup is generally similar to that heretofore shown and described, except that the finger gripping ring section 34c occupies most of the vertical height of the cup. It is provided with horizontal fins 40c adjacent the top and bottom thereof, and intermediate these fins 40c there is a succession of helically or spirally arranged fins 40c'. These fins are of the same double wall construction previously discussed, and serve the same purpose. A plurality of fins again is engaged by a thumb and finger, whereby to prevent undue heat transfer to the thumb and finger or fingers of the user.

Yet another embodiment of the invention is shown in FIGS. 9 and 10. Most of the parts are similar to those heretofore shown and described, and similar numerals with the addition of the suffix d are used to identify like parts. The distinguishing feature of the form of the invention shown in FIGS. 9 and 10 is that, while there may be a horizontal fin 40d adjacent the top of the intermediate finger gripping ring section, as in FIG. 7, there is provided a plurality of horizontal levels or rows of fins 40d' arranged in zig-zag fashion. The size and disposition of these zig-zag fins is such that it is the outer edges of fins that will be engaged by the thumb and fingers, rather than any sidewall portion of the cup.

Whether the cup be produced by axially collapsing portions thereof while the plastic material is in a plastic state, as in FIGS. 1–6, or otherwise, there is always provided a plurality of radially extending fins of re-entrant or double wall nature. These fins not only provide a substantially line contact with the fingers of the user, thereby inhibiting direct heat transfer, but space the sidewalls of the container away from the fingers of the user, thereby substantially eliminating the transfer of heat by radiation. As a result, even steaming hot coffee, soup, or other liquid comestibles readily can be lifted in the cup without burning or even making the fingers uncomfortable.

Specific dimensions have been shown in FIG. 2 for the preferred embodiment of the cup. It will be understood that the remaining embodiments of the cup are based on like dimensions, whereby the cup is always of a size conveniently to be grasped and lifted by one hand.

Although the preferred embodiments of the invention as heretofore shown and described have been in the nature of disposable or throw-away cups, it is apparent that the teachings of this application are also applicable to reusable containers. The cups have been shown as being round or circular, in accordance with the preferred form of the invention, but it will be understood that other shapes are contemplated. In addition, the fins have been disclosed as being normal to the cup or container axis, and it will be understood that this is the preferred embodiment, but does not rule out other angles. Furthermore, in connection with the preferred embodiments of the invention, the fins have been shown with upwardly and outwardly tapered sidewalls, the outlines of which are comprised of straight lines. It will be understood that this is not intended to rule out sidewalls having back-tapered (i.e., upward and inward) portions, or longitudinally curved sidewall sections.

The various embodiments of the invention as herein shown and described will be understood as being illustrative only. Changes in structure will, no doubt, occur to those skilled in the art, and will be understood as forming a part of the invention insofar as they fall within the spirit and scope of the appended claims.

The invention is claimed as follows:

1. A thin-wall plastic cup of integral one-piece construction comprising a bottom and a sidewall integral therewith and extending up to an open upper end, said sidewall having a plurality of integral fins projecting therefrom spaced apart a distance for a plurality of such fins to be engaged by the fingers of a user, each fin being of double wall re-entrant construction, the two walls of each fin being integrally joined only at the radial outer and inner limit extremities.

2. A thin-wall plastic container of integral one-piece construction and of a size adapted to be grasped and lifted readily with one hand, comprising a bottom, and a sidewall tapering upwardly and outwardly therefrom and terminating at its upper end in a reinforcing rim, said sidewall having a circumferential internal shoulder spaced downwardly from the rim a predetermined distance to provide an abutment, said sidewall further having an external circumferentially disposed reinforcing fin portion, the underside of which is spaced downwardly from said shoulder a distance not less than the axial extent of said rim and a distance less than said predetermined distance, said fin portion comprising a double wall section projecting radially outwardly from said sidewall and having an external diameter not greater than the diameter of said internal shoulder, whereby the underside of said fin will abut the shoulder of a like container telescopically associated therewith without wedging the periphery of the fin against the inner surface of the sidewall at a stacking height determined by said last named distance, the outer periphery of said fin terminating in a discrete finger-gripping apex formed by the juncture of said projecting double wall section.

3. A thin-wall plastic container as set forth in claim 2 wherein the radial extent of the fin is greater than the axial width thereof.

4. A thin-wall plastic container as set forth in claim 2 having a plurality of axially spaced circumferentially disposed reinforcing fins and a plurality of axially spaced internal shoulders complementary to said fins, each of said fins being so disposed as to nest within the complementary shoulder of a like telescopically associated container.

5. A thin-wall sheet formed plastic container of integral one-piece construction and of a size adapted to be grasped and readily lifted with one hand, comprising a bottom, and a sidewall tapering upwardly and outwardly therefrom and terminating at its upper edge with a reinforcing rim, said sidewall being provided with a plurality of annular ribs in finger bridging relation relative to each other and in predetermined spaced relation to the container rim, each said rib comprising a sheet portion projecting radially outwardly and bent substantially reversely to provide a pair of juxtaposed substantially parallel walls forming an insulating and reinforcing projecting rib essentially thermo isolating the contents of the container.

6. A sheet formed plastic container as defined in claim 5 wherein the diameter of a lower rib is substantially equal to but not greater than the internal diameter of the container sidewall immediately above an upper rib, so that the container may be nested within a like container at an axial spacing substantially equal to the axial spacing between the ribs.

7. A sheet formed plastic container as defined in claim 5 wherein the container sidewall is provided with a pair of sections of different angularity extending inwardly and downwardly respectively beneath each rib, the upper of said sections having the greater horizontal component.

8. A sheet formed plastic container as defined in claim 5 wherein said container sidewall is provided with at least three said ribs.

9. A thin-wall sheet formed plastic container of integral one-piece construction and of a size adapted to be grasped and readily lifted with one hand, comprising a bottom, and a sidewall tapering upwardly and outwardly therefrom and terminating at its upper edge with a reinforcing rim, and stacking means for stacking and nesting the container within a like container in axially spaced nested relation, said stacking means comprising a plurality of circumferentially disposed shoulders and a plurality of circumferentially disposed complementary ribs provided on the container sidewall, the axial spacing between each rib and its complementary shoulder being substantially equal and the outer diameter of each rib being substantially equal to but not greater than the internal diameter of the container sidewall adjacent the complementary shoulder, and the container sidewall shaping being such that each rib may be brought substantially into juxtaposition with the complementary shoulder of a like nested container.

10. A sheet formed container as defined in claim 9 wherein said shoulders and ribs are cooperatively shaped to provide, when in engagement, limited axial resiliency between said container and a like container nested therewith.

References Cited by the Examiner
UNITED STATES PATENTS

| | | | |
|---|---|---|---|
| 1,161,493 | 11/1915 | Macfarren | 165—183 |
| 1,871,365 | 8/1932 | Griswold. | |
| 1,992,296 | 2/1935 | Dewald | 165—184 |
| 2,617,549 | 11/1952 | Egger. | |
| 2,667,337 | 1/1954 | Chapman | 165—184 |
| 2,711,382 | 6/1955 | Smith-Johannsen | 165—181 X |
| 2,717,619 | 9/1955 | Whitman. | |
| 2,905,350 | 9/1959 | Edwards | 229—1.5 |
| 2,967,652 | 1/1961 | Canfield | 229—1.5 X |
| 3,007,377 | 11/1961 | Muller | 229—1.5 X |
| 3,045,887 | 7/1962 | Caine | 229—1.5 |
| 3,078,025 | 2/1963 | Welshon | 229—1.5 |
| 3,085,730 | 4/1963 | Fibish | 229—1.5 |
| 3,091,360 | 5/1963 | Edwards | 229—1.5 |

FOREIGN PATENTS
| | | |
|---|---|---|
| 226,245 | 12/1959 | Australia. |

References Cited by the Applicant
UNITED STATES PATENTS

| | | |
|---|---|---|
| 795,437 | 7/1905 | Geuder. |
| 3,157,335 | 11/1964 | Maier. |

FRANKLIN T. GARRETT, *Primary Examiner.*

EARLE J. DRUMMOND, *Examiner.*